United States Patent
Wagner et al.

(10) Patent No.: US 11,663,444 B2
(45) Date of Patent: May 30, 2023

(54) PIPELINED NEURAL NETWORK PROCESSING WITH CONTINUOUS AND ASYNCHRONOUS UPDATES

(71) Applicant: Microsoft Technology Licensing, LLC, Redmond, WA (US)

(72) Inventors: Andy Wagner, Cupertino, CA (US); Tiyasa Mitra, San Jose, CA (US); Saurabh M. Kulkarni, Redmond, WA (US); Marc Tremblay, Bellevue, WA (US); Sujeeth S. Bharadwaj, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 910 days.

(21) Appl. No.: 16/585,105

(22) Filed: Sep. 27, 2019

(65) Prior Publication Data

US 2021/0097366 A1    Apr. 1, 2021

(51) Int. Cl.
*G06N 3/04* (2023.01)
*G06F 40/20* (2020.01)
*G06N 3/084* (2023.01)

(52) U.S. Cl.
CPC ............... *G06N 3/04* (2013.01); *G06F 40/20* (2020.01); *G06N 3/084* (2013.01)

(58) Field of Classification Search
CPC .......... G06N 3/04; G06N 3/084; G06N 3/063; G06N 3/0454; G06F 40/20; G06F 9/5061; G06F 9/5038
See application file for complete search history.

(56) References Cited

U.S. PATENT DOCUMENTS

| | | | |
|---|---|---|---|
| 11,232,356 B2 * | 1/2022 | Chen | G06N 3/04 |
| 2014/0142929 A1 | 5/2014 | Seide et al. | |
| 2018/0315398 A1 | 11/2018 | Kaul et al. | |
| 2018/0336458 A1 | 11/2018 | Tomioka et al. | |
| 2018/0341860 A1 | 11/2018 | Shazeer et al. | |

(Continued)

OTHER PUBLICATIONS

Ashish Vaswani, Attention Is All You Need et al, Published Jun. 12, 2017 (Year: 2017).*

(Continued)

*Primary Examiner* — Grant Sitta
(74) *Attorney, Agent, or Firm* — Ranjeev Singh; Singh Law, PLLC

(57) ABSTRACT

Systems and methods for pipelined neural network processing with continuous and asynchronous updates are described. A method for processing a neural network comprising L layers, where L is an integer greater than two, includes partitioning the L layers among a set of computing resources configured to process forward passes and backward passes associated with each of the L layers. The method further includes initiating processing of the forward passes and the backward passes using the set of computing resources. The method further includes upon completion of a first set of forward passes and a first set of backward passes associated with a first layer of the L layers, initiating update of parameters associated with the first layer when gradients are available for updating the parameters associated with the first layer without waiting to calculate gradients associated with any of remaining L layers.

20 Claims, 9 Drawing Sheets

(56) References Cited

U.S. PATENT DOCUMENTS

2019/0130249 A1* 5/2019 Bradbury ................ G06N 3/08

OTHER PUBLICATIONS

Chi-Chung Chen, Efficient and Robust Parallel DNN Training through Model Parallelism on Multii-GPU Platform (Year: 2019).*
Chen, Chi-Chuang, "Efficient and Robust Parallel DNN Training through Model Parallelism on Multi-GPU Platform", In proceeding of Cornell University, Sep. 8, 2018, 11 Pages.
Huang, Yanping, "GPipe: Easy Scaling with Micro-Batch Pipel ine Parallelism", In proceeding of Computer Science > Computer Vision and Pattern Recognition, Jul. 25, 2019, 11 Pages.
"International Search Report and Written Opinion Issued in PCT Application No. PCT/US20/038301", dated Sep. 25, 2020, 15 Pages.
Devlin, et al., "BERT: Pre-training of Deep Bidirectional Transformers for Language Understanding", In Repository of arXiv: 1810.04805, May 24, 2019, 16 Pages.
Harlap, et al., "PipeDream: Fast and Efficient Pipeline Parallel DNN Training", In Repository of arXiv: 1806.03377, Jun. 8, 2018, 14 Pages.
Huo, et al., "Decoupled Parallel Backpropagation with Convergence Guarantee", In Proceedings of the 35th International Conference on Machine Learning, Jul. 10, 2018, 9 Pages.

* cited by examiner

PIPELINED NEURAL NETWORK PROCESSING WITH CONTINUOUS AND ASYNCHRONOUS UPDATES

BACKGROUND

Neural network technology is used to perform complex tasks such as reading comprehension, language translation, image recognition, or speech recognition. Machine learning services, such as those based on Natural Language Processing (NLP), Recurrent Neural Networks (RNNs), Convolution Neural Networks (CNNs), Long Short Term Memory (LSTM) neural networks, or Gated Recurrent Units (GRUs) have been deployed to perform such complex tasks. While these types of neural networks have been deployed, there is a need for continued improvement in the underlying architecture to perform these complex tasks.

SUMMARY

In one example, the present disclosure relates to a method for processing a neural network comprising L layers, where L is an integer greater than two. The method may include partitioning the L layers among a set of computing resources configured to process forward passes and backward passes associated with each of the L layers. The method may further include initiating processing of the forward passes and the backward passes using the set of computing resources. The method may further include upon completion of a first set of forward passes and a first set of backward passes associated with a first layer of the L layers, initiating update of parameters associated with the first layer when gradients are available for updating the parameters associated with the first layer without waiting to calculate gradients associated with any of remaining L layers.

In another example, the present disclosure relates to a system for processing a neural network comprising L layers, where L is an integer greater than two. The system may include a set of computing resources configured to process forward passes and backward passes associated with each of the L layers, where the L layers are partitioned among the set of computing resources, where each of the set of computing resources is configured to asynchronously initiate an update of weights associated with a layer of the L layers when gradients are available for updating the weights associated with the layer without having to receive gradients associated with any of remaining L layers.

In a yet another example, the present disclosure relates to a method for processing a neural network comprising L layers, where L is an integer greater than two. The method may include as part of a first stage of a pipeline, using a first computing resource initiating processing of a first forward pass associated with a first layer of the L layers. The method may further include as part of a second stage of the pipeline: (1) using the first computing resource, initiating processing of a first forward pass associated with a second layer of the L layers and (2) using a second computing resource, initiating processing of a second forward pass associated with the first layer of the L layers. The method may further include as part of a third stage of the pipeline: (1) using the first computing resource, initiating processing of a first forward pass associated with a third layer of the L layers, (2) using the second computing resource, initiating processing of a second forward pass associated with the second layer of the L layers, and (3) using a third computing resource, initiating processing of a third forward pass associated with the first layer of the L layers. The method may further include as part of a fourth stage of the pipeline: (1) using the first computing resource, initiating processing of a first forward pass associated with a fourth layer of the L layers, (2) using the second computing resource, initiating processing of a second forward pass associated with the second layer of the L layers, and (3) using the third computing resource, initiating a backward pass associated with the first layer of the L layers. The method may further include as part of a fifth stage of the pipeline: (1) using the first computing resource, initiating processing of a first forward pass associated with a fifth layer of the L layers, (2) using the second computing resource, initiating processing of a second backward pass associated with the first layer of the L layers, and (3) using the third computing resource, updating weights associated with the first layer of the L layers when gradients associated with the weights are accumulated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
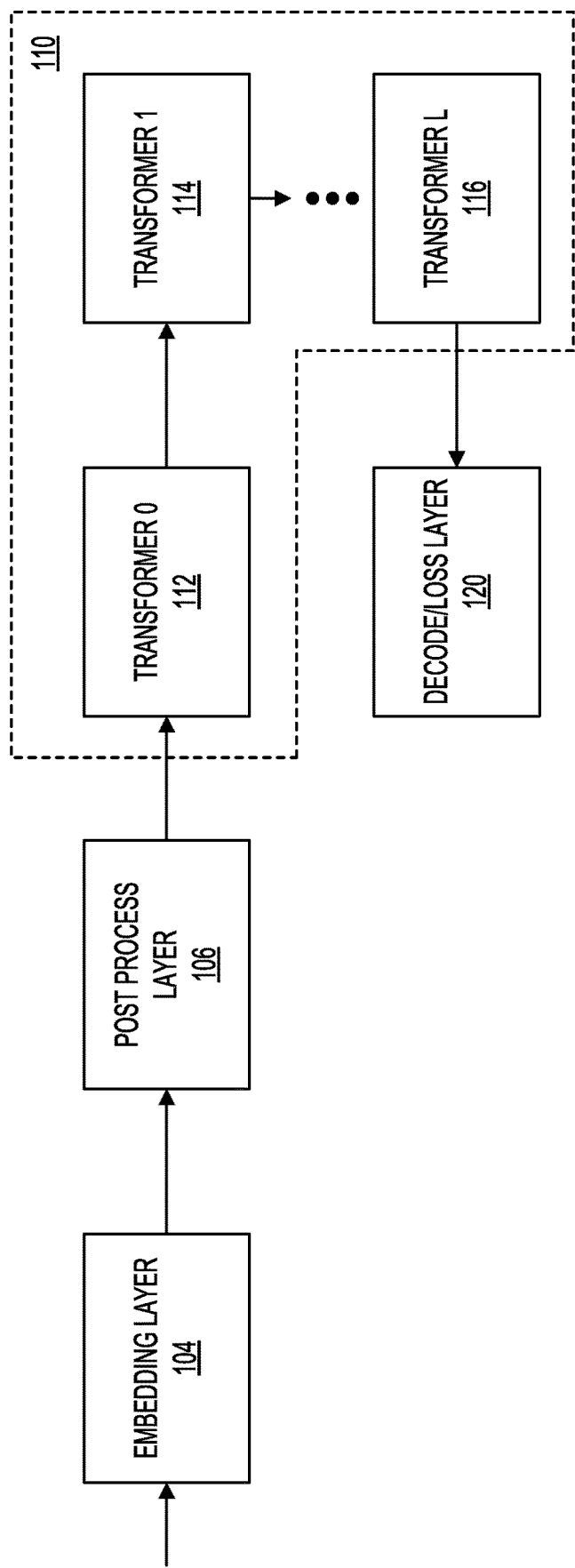
FIG. 1 shows an example architecture of a Bidirectional Encoder Representations from Transformers (BERT) implementation that may be trained using pipelined model parallelism.

Examples disclosed in the present example relate to neural network processing with continuous asynchronous updates. Certain examples relate to neural network processing in which the layers, sublayers, or even smaller portions of the neural network are partitioned to achieve parallelism. Certain examples further relate to model parallelism. As an example, in model parallelism, different machines in the system may be responsible for the computations in different parts of a single network—for example, each layer, sublayer, or even a smaller portion of the neural network may be assigned to a different machine in the system. Thus, as part of model parallelism, the neural network model may be split among different machines (e.g., CPUs, GPUs, IPUs, FPGAs, or other types of machines) but each machine may use the same data. As an example, model parallelism may be achieved by splitting the weights among the machines.

In general, neural networks consist of many numeric operations which need to be efficiently partitioned across computation resources. There are many approaches to this partitioning, each of which is highly model and architecture specific. One approach is to split the neural network layers onto sequential compute resources to achieve pipeline parallelism. Pipeline parallelism can be very efficient for processing feedforward networks but becomes much more complicated when feedback and weight updates are applied. One technique for neural networks is to update weights based on a mini-batch. This approach, however, is inefficient for a pipelined model as it requires the contents to be flushed out of the pipeline before continuing. The flushing operation requires the pipeline to be cleared out at the end of the mini-batch and refilled at the start of the next mini-batch, leading to inefficiency.

Certain examples in this disclosure relate to, during training of a neural network model, updating weights continually and asynchronously. Weight updates are applied during backpropagation. As an example, the gradient of a loss function with respect to the weights in the network (or a portion of the network) is calculated. The gradient is then fed to an optimization method that uses the gradient to update the weights to minimize the loss function. The goal with backpropagation is to update each of the weights (or at least some of the weights) in the network so that they cause the actual output to be closer to the target output, thereby minimizing the error for each output neuron and the network as a whole.

As part of model parallelism, the network may be partitioned into different neural computational units each of which may be processed independently by a computing resource. Each computing resource may be implemented as a separate device (e.g., a GPU, a TPU, or an IPU) or the computing resources may share a device. Thus, in one example, each device (e.g., an IPU) may include two computing resources that could process two different computational units (e.g., two different layers) associated with the neural network model.

The pipelined model parallelism is explained using an example of the Bidirectional Encoder Representations from Transformers (BERT) model. The BERT model may be used for word completions for sentences and other natural language processing (NLP) related problems. FIG. 1 shows an example architecture of a BERT implementation 100 that may be trained using pipelined model parallelism. BERT implementation 100 may be used to learn contextual relations between words in a text. BERT implementation 100 may comprise input stages, including an embedding layer 104 and a post process layer 106. BERT implementation 100 may further include transformers 110, including transformer 0 112, transformer 1 114, and transformer L 116. BERT implementation 100 may further include a decode/loss layer 120. Embedding layer 104 may convert each input token (e.g., a word in a sequence) into a vector representation. Vector size may be a 768-dimension vector or a 1024-dimension vector. Post process layer 106 may perform additional operations, including position embedding, sentence embedding, and token masking. Position embedding may be used to show token positions within a sequence. Sentence embedding may be used to map sentences to vectors. Token masking may include replacing a certain percentage of the words in each sequence with a mask token. Transformers are described in detail later. Decode/loss layer 120 may produce predictions based on the training.

Figure 2:
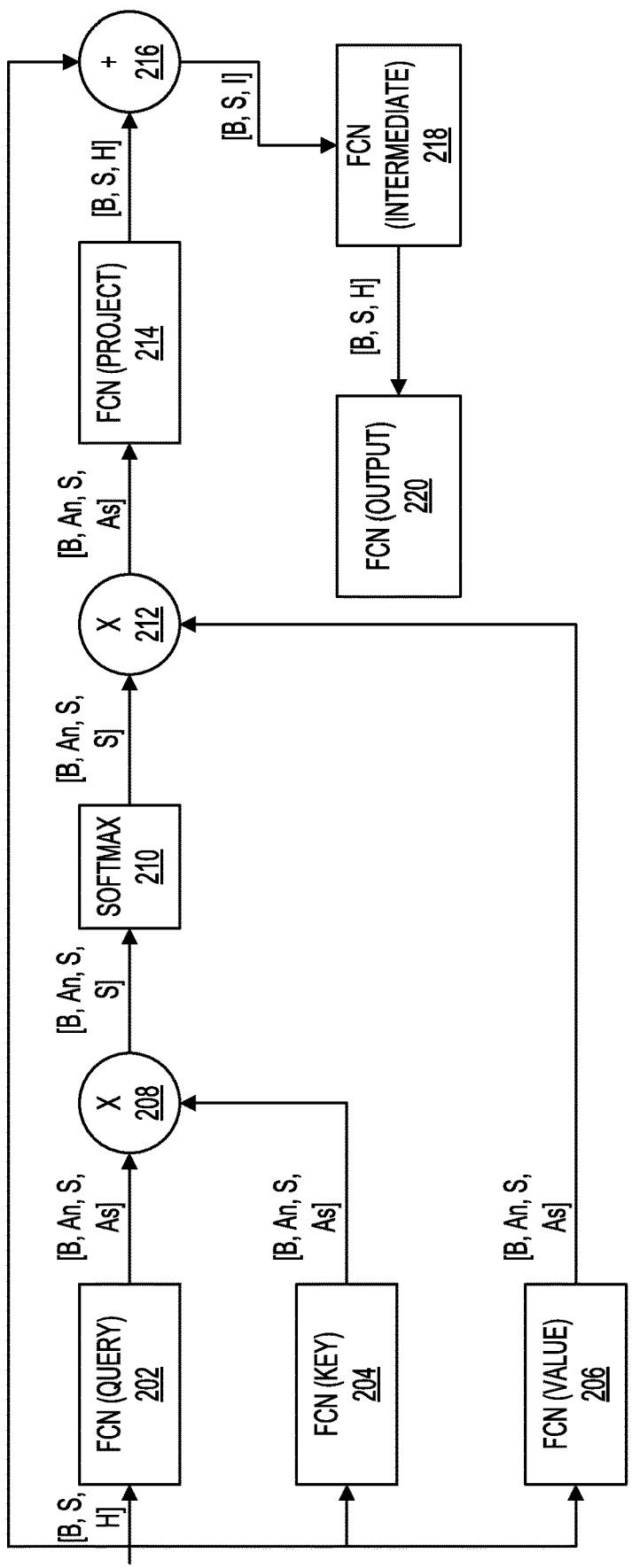
FIG. 2 shows a block diagram of a transformer in accordance with one example.

FIG. 2 shows a block diagram of a transformer 200 in accordance with one example. Transformer 200 may correspond to any of transformer 0 112, transformer 1 114, and transformer L 116 of FIG. 1. Transformer 200 may convert input sequences into output sequences using self-attention. Transformer 200 may be configured such that it can process a batch of layers with a batch size of B. Sequence (S) length may refer to the number of words in each sequence being processed. Transformer 200 may be configured to have either 12 or 24 hidden (H) layers. Vector size (also referred to as hidden (H) size) may specify whether each word is converted into a 768-dimension vector or a 1024-dimension vector. Intermediate (I) size may be a 3072-dimension vector or a 4096-dimension vector.

With continued reference to FIG. 2, transformer 200 may include fully-connected network (FCN) layers, including FCN (Query) 202, FCN (Key) 204, and FCN (Value) 206. Self-attention may map a query and a set of key-value pairs to an output. Attention function may be implemented using SoftMax block 210. Transformer 200 may further include additional fully-connected network (FCN) layers, including FCN (Project) 214, FCN (Intermediate) 218, and FCN (Output) 220. FCN (Intermediate) 218 may relate to the intermediate representations of the same tokens as represented in the output (FCN (Output) 220). In terms of the complexity of operations associated with the transformers, fully connected layers are the dominant factors.

Figure 3:
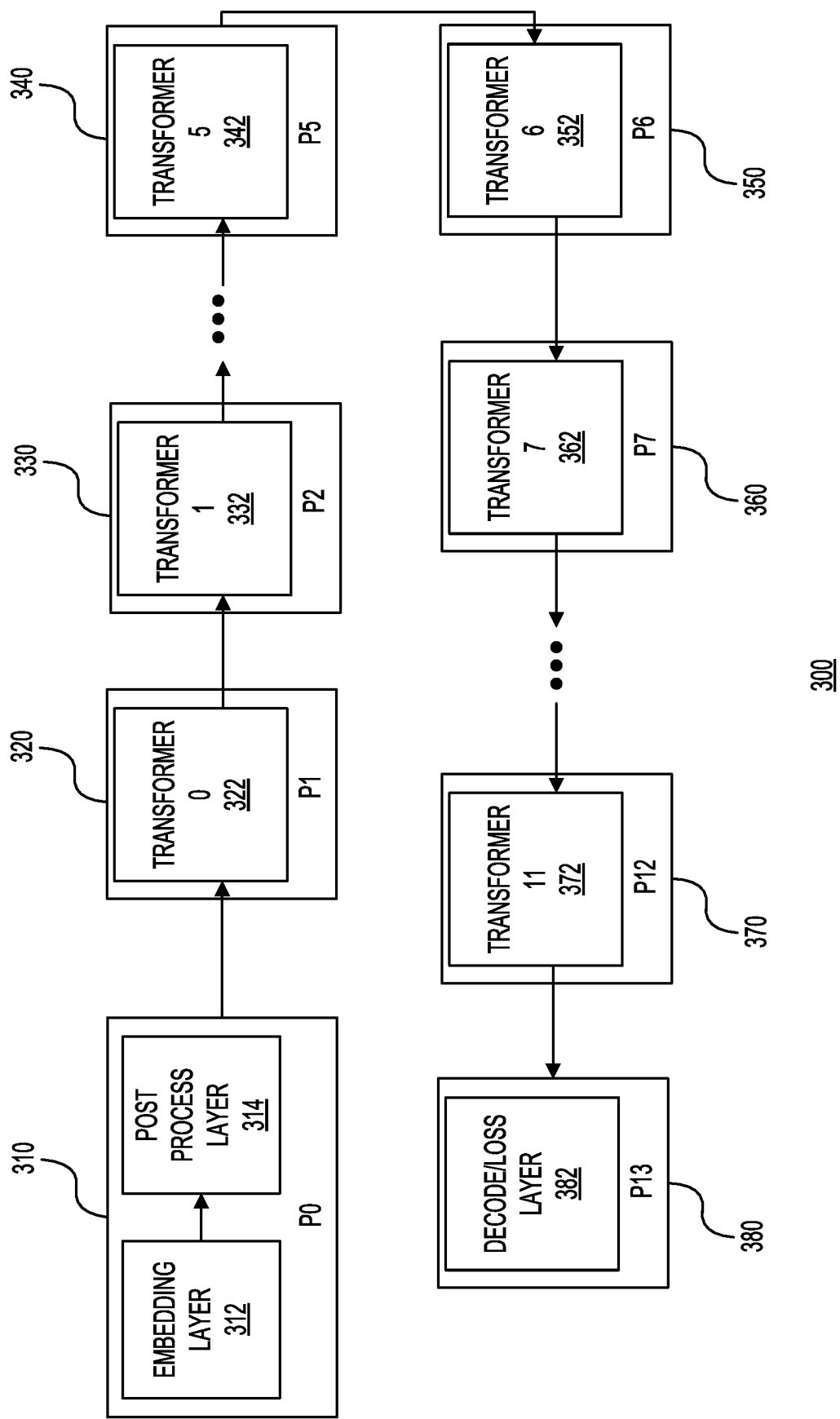
FIG. 3 shows a system with partitioning of transformers to computing resources in accordance with one example.

FIG. 3 shows a system 300 with partitioning of transformers to computing resources in accordance with one example. In this example, the computing resources may be any combination of processing cores and memory. The pipeline may be structured in a way such that each computing resource in the pipeline (e.g., a processor or a combination of a processor and memory) handles approximately the same amount of operations. This may help ensure effective pipeline utilization. In system 300, embedding layer 312 and post process layer 314 of the BERT model may be configured for processing by computing resource P0 310. Transformer 0 322 may be configured for processing by computing resource P1 320. Transformer 1 332 may be configured for processing by computing resource P2 330. Transformer 5 342 may be configured for processing by computing resource P5 340. Transformer 6 352 may be configured for processing by computing resource P6 350. Transformer 7 362 may be configured for processing by computing resource P7 360. Transformer 11 372 may be configured for processing by computing resource P12 370. Decode/loss layer 382 of the BERT model may be configured for processing by computing resource P13 380. Although FIG. 3 shows each transformer partitioned to a separate computing resource, the transformers may share a computing resource. Thus, as an example, two transformers may be partitioned per computing resource. Each computing resource may be implemented using any number of graphics processing units (GPUs), computer processing units (CPUs), memory (e.g., SRAM or other types of memory), or field programmable gate arrays (FPGAs). Application Specific Integrated Circuits (ASICs), Erasable and/or Complex programmable logic devices (PLDs), Programmable Array Logic (PAL) devices, and Generic Array Logic (GAL) devices may also be used to implement the computing resources. In addition, although FIG. 3 describes the partitioning of the BERT model, any serializable neural network model may be partitioned and processed as long as it uses gradient descent with a backward pass.

Figure 4:
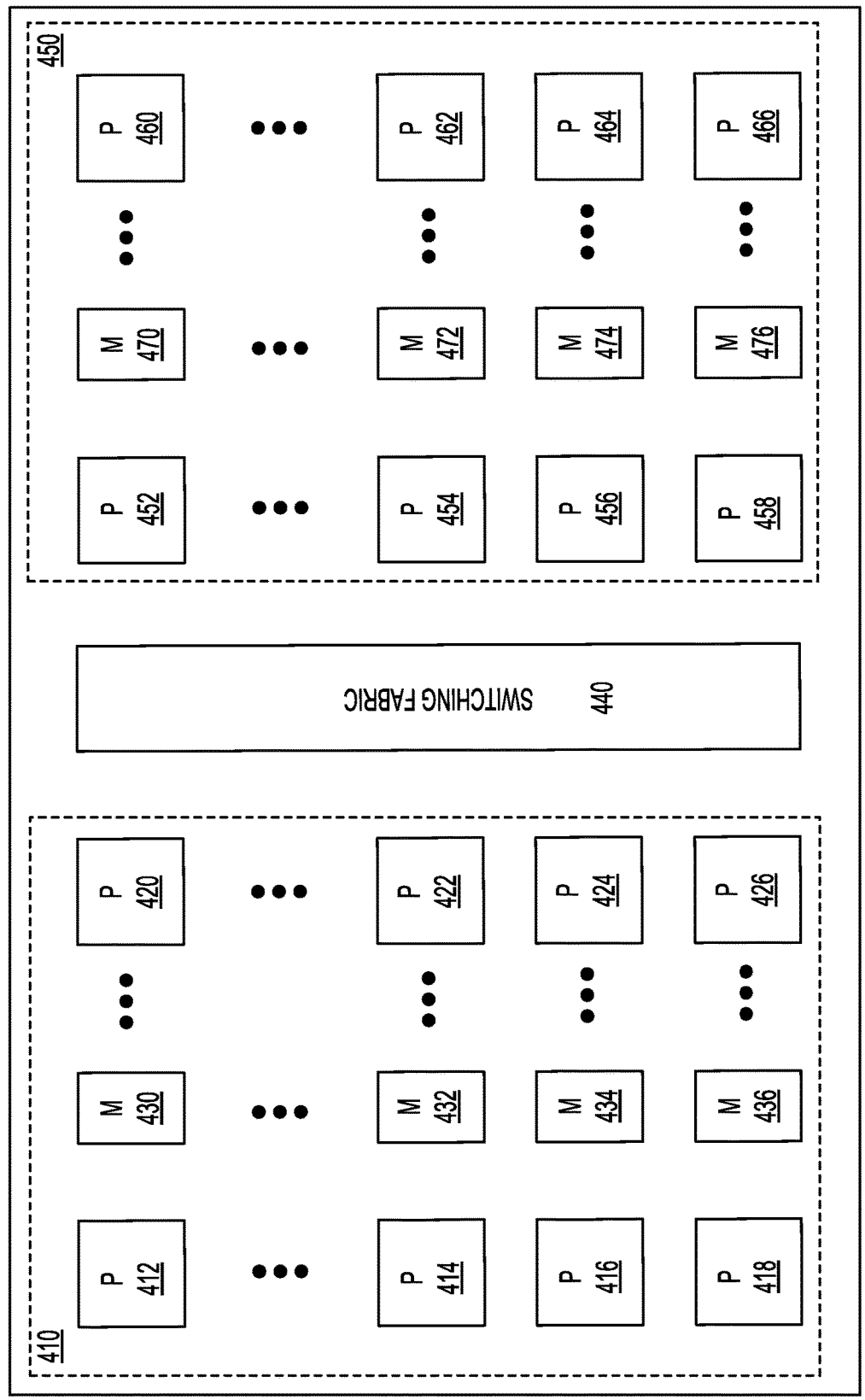
FIG. 4 shows an implementation of a computing resource configured to process a neural network model in accordance with one example.

FIG. 4 shows an implementation of a computing resource 400 configured to process a neural network model in accordance with one example. In this example, computing resource 400 may correspond to each of the computing resources described as part of FIG. 3. Computing resource 400 may include two sets of processing cores and memory coupled via a switching fabric 440. First set 410 may include processing cores P 412, P 414, P 416, P 418, P 420, P 422, P 424, and P 426. The processing cores may be arranged in columns and may access local memory (e.g., SRAM or BRAM). First set 410 may include local memory M 430, M 432, M 434, and M 436. Second set 450 may include processing cores P 452, P 454, P 456, P 458, P 460, P 462, P 464, and P 466. The processing cores may be arranged in columns and may access local memory (e.g., SRAM or BRAM). Second set 450 may include local memory M 470, M 472, M 474, and M 476. The two sets may communicate via switching fabric 440. As an example, the processing cores may communicate with other processing cores via message passing or other techniques. Although FIG. 4 shows a certain number of components of computing resource 400 arranged in a certain manner, there could be more or fewer number of components arranged differently. Processing core may be implemented using FPGAs, CPUs, GPUs, or other processing arrangements. An image file may be used to configure or re-configure the FPGAs. The image file or similar file or program may be delivered via a network link or a local link (e.g., PCIe) from a host CPU. Information included in an image file can be used to program the logic blocks and reconfigurable interconnects of an FPGA to implement desired functionality. Desired functionality can be implemented to support any service that can be offered via a combination of computing, networking, and storage resources such as via a data center or other infrastructure for delivering a service.

The trained models can be deployed in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

In addition to the BERT model, machine learning services such as those based on Recurrent Neural Networks (RNNs), Convolution Neural Networks (CNNs), Long Short Term Memory (LSTM) neural networks, or Gated Recurrent Units (GRUs) may also be implemented using the examples described in this disclosure. In one example, the service-related content or other information, such as words, sentences, images, videos, or other such content/information, may be translated into a vector representation. The vector representation may correspond to techniques such as RNN, CNN, LSTM, or GRU. In one example, the neural network model may comprise of many layers and each layer may be encoded as matrices or vectors of weights expressed in the form of coefficients or constants that have been obtained via off-line training of a neural network. Programmable hardware logic blocks in the nodes may process the matrices or vectors to perform various operations, including multiply, add, and other operations against input vectors representing encoded information related to the service. In one example, the matrices or vectors of weights may be partitioned and pinned across multiple nodes by using techniques such as graph partitioning. As part of this process, a large neural network may be translated into an intermediate representation (e.g., a graph) and then the intermediate representation may be carved into smaller representations (e.g., subgraphs) and each of the matrices of weights corresponding to each sub-graph may be pinned to a node's on-chip memories. In one example, the models may be translated into fixed-size matrices and vectors. This way, the processor's resources may operate on the fixed-size matrices and vectors in parallel.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

In this example, inside each LSTM layer, the inputs and hidden states may be processed using a combination of vector operations (e.g., dot-product, inner product, or vector addition) and non-linear functions (e.g., sigmoids, hyperbolic, and tangents). In certain cases, the most compute intensive operations may arise from the dot products, which may be implemented using dense matrix-vector and matrix-matrix multiplication routines. In one example, the processing of the vector operations and non-linear functions may be performed in parallel.

Figure 5:
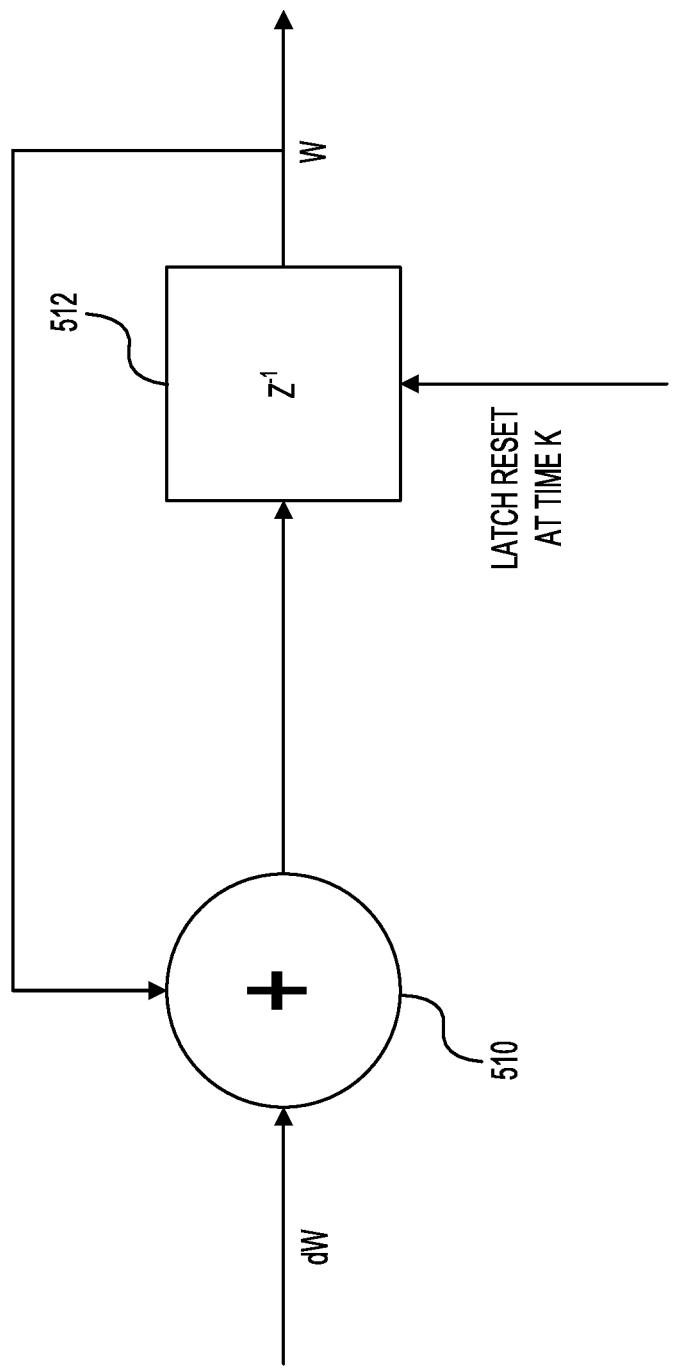
FIG. 5 shows a diagram illustrating accumulation of gradients for training a neural network model in accordance with one example.

FIG. 5 shows a diagram 500 illustrating accumulation of gradients for training a neural network model in accordance with one example. One of the techniques for updating weights in neural networks is batched stochastic gradient descent, which involves running multiple samples through a network before updating the weights. There are different ways for dealing with larger batch size but all of them require a large amount of memory. In this example, to reduce the memory needs, gradient accumulation may be used. As part of gradient accumulation, after each backward pass, the computed gradient (e.g., dW) may be added to the previously accumulated gradient (e.g., W). The following equation may be used:

$$w_n = w_{n-k} + \sum_{n-k}^{n} \nabla w_k$$

Gradient accumulation may be performed in hardware (e.g., by implementing the above equation), which may be included in the computing resources described earlier. The hardware implementation may include an adder 510 and block 512, which may compute the block average. The block average may be reset at time K or at another time. Alternatively, the block average may be reset after a certain specified number of backward passes. The use of gradient accumulation may allow the computing resources (e.g., the processors shown in FIG. 3) to keep the changes to the weights on chip. After an update of the weights, the on-chip accumulated gradients may be flushed, and accumulation process may start over. Although FIG. 5 shows a certain way of accumulating gradients, other ways may also be used. In addition, the accumulated gradients may be used to update parameters other than the weights. Such parameters include any adaptive parameters associated with a neural network model, including biases and batch normalization parameters.

Figure 6:
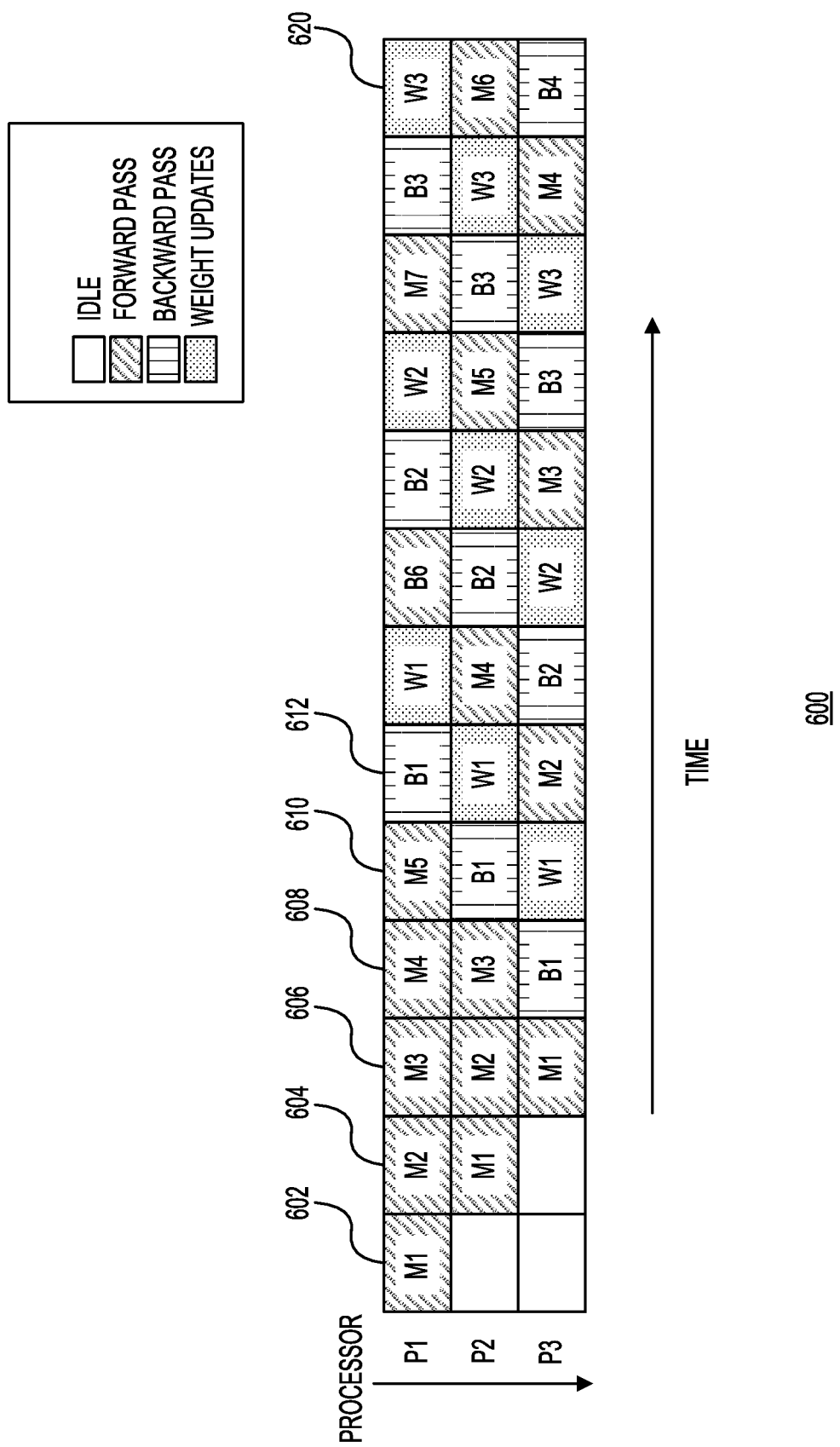
FIG. 6 shows a pipeline graph of continuous and asynchronous weight updates during training of a neural network model in accordance with one example.

FIG. 6 shows a pipeline graph 600 of continuous and asynchronous weight updates during training of a neural network model in accordance with one example. This pipeline graph 600 shows the performance of forward passes (designated by letter M), backward passes (designated by letter B) and weight updates (designated by letter W) for each pipeline stage. In this example, three processors P1, P2, and P3 are scheduled to perform these operations. As explained earlier, using model parallelism the neural network model may be partitioned among computing resources (e.g., any number of processors). At pipeline stage 602, processor P1 initiates the processing of a first forward pass (M1) for a first layer of the neural network model being processed. In one example, this forward pass may correspond to one of the transformer layers described earlier. At this pipeline stage, both processors P2 and P3 are idle. At pipeline stage 604, after completing the first forward pass (M1) for the first layer of the neural network model, processor P1 initiates the processing of a first forward pass (M2) for a second layer of the neural network model. In addition, at pipeline stage 604, processor P2 initiates the processing of the second forward pass (M1) for the first layer of the neural network model. At this pipeline stage, processor P3 is still idle. At pipeline stage 606, after completing the first forward pass (M2) for the second layer, processor P1 initiates the processing of the first forward pass (M3) for a third layer of the neural network model. In addition, at pipeline stage 606, processor P2 initiates the processing of a second forward pass (M2) for the second layer of the neural network model. Moreover, at pipeline stage 606, processor P3 initiates the processing of the third forward pass (M1) for the first layer of the neural network model. This example assumes that the model (or a subset of the model (e.g., a mini-batch)) requires three forward passes per layer. Thus, after the completion of the third forward pass (M1) for the first layer of the neural network model, backward propagation may start.

With continued reference to FIG. 6, at stage 608, processor P1 initiates the processing of the first forward pass (M4) for a fourth layer of the neural network model. In addition, at pipeline stage 608, processor P2 initiates the processing of the second forward pass (M3) for the third layer of the neural network model. Moreover, at pipeline stage 608, processor P3 initiates the processing of the first backward pass (B1) for the first layer of the neural network model. At stage 610, processor P1 initiates the processing of the first forward pass (M5) for a fifth layer of the neural network model. In addition, at pipeline stage 610, processor P2 initiates the processing of the second backward pass (B1) for the first layer of the neural network model. Moreover, at pipeline stage 610, processor P3 initiates the updates of the weights (W1) for the first layer of the neural network model. The weight updates are initiated asynchronously and continuously as shown in pipeline graph 600. The accumulated gradients may be used to perform the weight updates. At stage 612, processor P1 initiates the processing of the third backward pass (B1) for the first layer of the neural network model. In addition, at pipeline stage 612, processor P2 initiates updates of the weights (W1) for the first layer of the neural network model. Moreover, at pipeline stage 612, processor P3 initiates the processing of the third forward pass for the third layer of the neural network model. The forward passes, the backward passes, and the weight updates are processed as shown in pipeline graph 600. As an example, at pipeline stage 620, processor P1 initiates the weight updates for the third layer based on the third backward pass associated with the third layer. At this stage, in addition, processor P2 initiates the processing of the first forward pass associated with the sixth layer of the neural network model and processor P3 initiates the processing of the first backward pass associated with the fourth layer of the neural network model. Each computation performed by any of the processors may take less or more time than other computations performed in the pipeline. In general, however, as noted earlier, the neural network model processing is partitioned in a manner such that at each pipeline stage the processor (or other computing resources) have similar workload.

Figure 7:
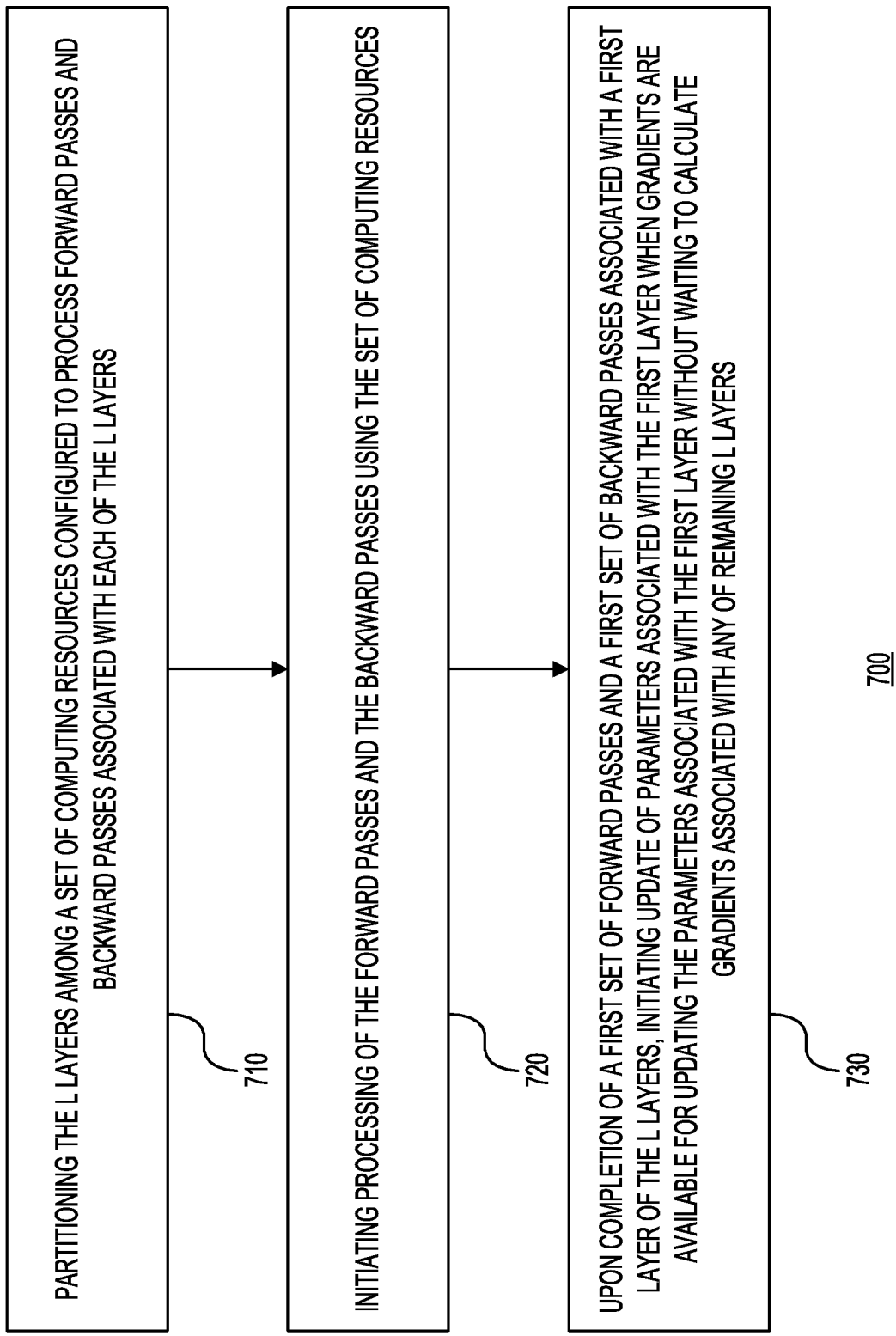
FIG. 7 shows a flow diagram of a method for initiating updates of the weights during training of a neural network model in accordance with one example.

FIG. 7 shows a flow diagram 700 of a method for initiating updates of the weights during training of a neural network model in accordance with one example. Step 710 may include partitioning the L layers among a set of computing resources configured to process forward passes and backward passes associated with each of the L layers. Partitioning may be performed using code configured to partition the model based on machine language frameworks, such as Tensorflow, Apache MXNet, and Microsoft® Cognitive Toolkit (CNTK). As an example, this step may include partitioning of the BERT model as shown in FIG. 3. Thus, the various layers of the BERT model may be assigned for processing using different processors (or similar computing resources). This way the various parameters associated with layers may be processed in parallel. Thus, for the BERT model example with 12 layers there maybe 110 million parameters. Each computing resource may process approximately 9 million parameters per layer. For a larger BERT model with 24 layers there may be 340 million parameters. If the model is partitioned across eight computing resources (e.g., a computing resource similar to computing resource 400 of FIG. 4) then each computing resource may process approximately 64 million parameters. In another example, if the BERT model is partitioned across sixteen computing resources, then each computing resource may process approximately 32 million parameters. Other types of neural network models may also be partitioned for processing as part of this step.

Step 720 may include initiating processing of the forward passes and the backward passes using the set of computing resources. As part of this step, a scheduler (or some other software) may initiate processing of the forward passes and the backward passes. In this example, the processing may occur in a pipelined manner similar to as described with respect to FIG. 6.

Step 730 may include, upon completion of a first set of forward passes and a first set of backward passes associated with a first layer of the L layers, initiating update of parameters associated with the first layer when gradients are available for updating the parameters associated with the first layer without waiting to calculate gradients associated with any of remaining L layers. In this example, the parameters may comprise weights. As part of this step, similar to as shown in FIG. 6, weight updates associated with the first layer may be initiated without waiting to calculate gradients associated with the remaining layers. The weight updates may be based on the accumulated gradients (e.g., as explained with respect to FIG. 5). Although FIG. 7 describes a certain number of steps performed in a certain order, additional or fewer steps in a different order may be performed.

Figure 8A:
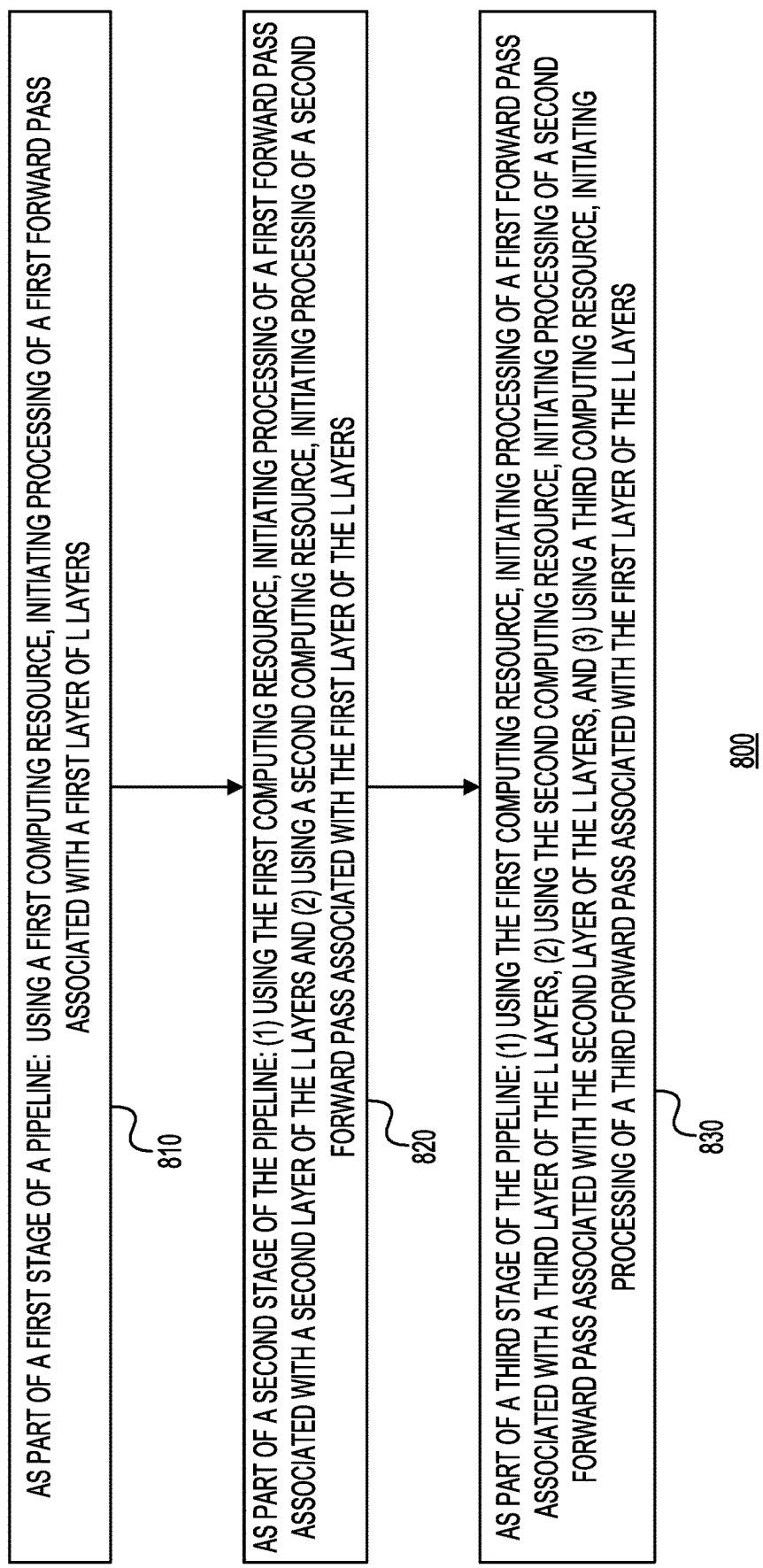
FIGS. 8A and 8B show a flow diagram of another method for updating weights during training of a neural network model in accordance with one example.
Figure 8B:
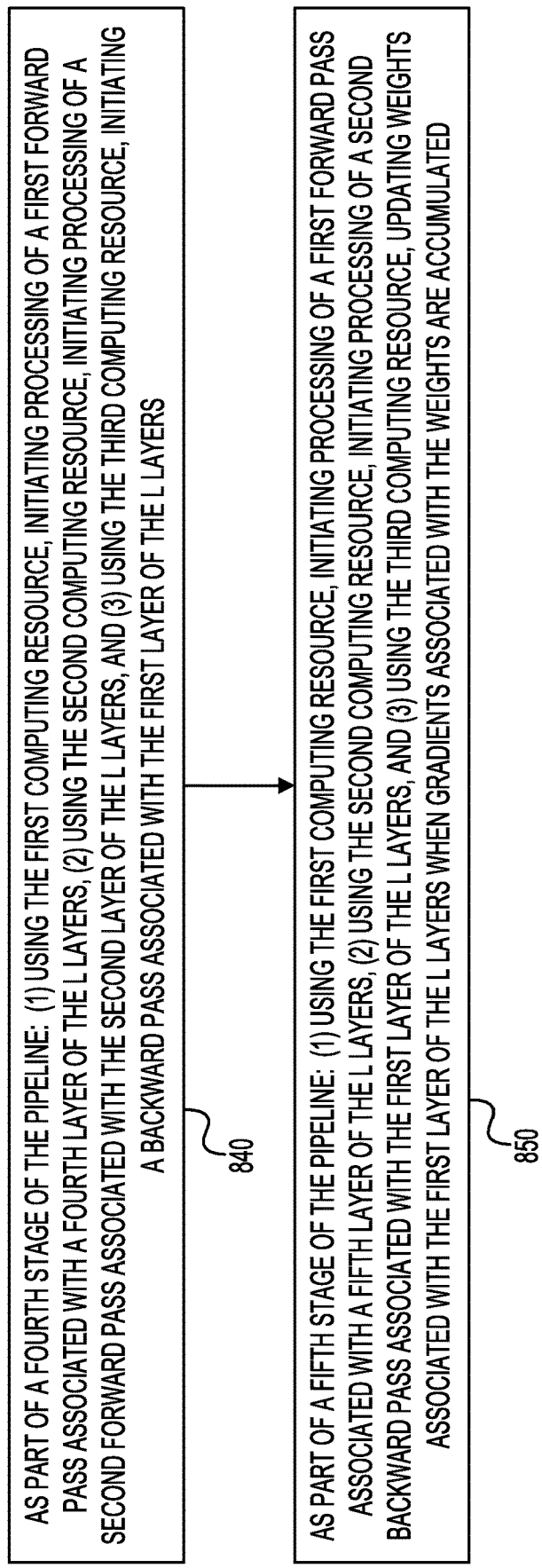

FIGS. 8A and 8B show a flow diagram 800 of another method for updating weights during training of a neural network model in accordance with one example. Step 810 may include as part of a first stage of a pipeline, using a first computing resource initiating processing of a first forward pass associated with a first layer of the L layers. In this example, this step may correspond to pipeline state 602 of FIG. 6. Thus, as part of this step, processor P1 may initiate the processing of a first forward pass (M1) for a first layer of the neural network model being processed. In one example, this forward pass may correspond to one of the transformer layers described earlier.

Step 820 may include as part of a second stage of the pipeline: (1) using the first computing resource, initiating processing of a first forward pass associated with a second layer of the L layers and (2) using a second computing resource, initiating processing of a second forward pass associated with the first layer of the L layers. In this example, this step may correspond to pipeline stage 604 of FIG. 6. Thus, as part of this step, processor P1 may initiate the processing of a first forward pass (M2) for a second layer of the neural network model and processor P2 may initiate the processing of the second forward pass (M1) for the first layer of the neural network model.

Step 830 may include as part of a third stage of the pipeline: (1) using the first computing resource, initiating processing of a first forward pass associated with a third layer of the L layers, (2) using the second computing resource, initiating processing of a second forward pass associated with the second layer of the L layers, and (3) using a third computing resource, initiating processing of a third forward pass associated with the first layer of the L layers. In this example, this step may correspond to pipeline stage 606 of FIG. 6. Thus, as part of this step, processor P1 may initiate the processing of the first forward pass (M3) for a third layer of the neural network model; processor P2 may initiate the processing of a second forward pass (M2) for the second layer of the neural network model; and processor P3 may initiate the processing of the third forward pass (M1) for the first layer of the neural network model.

Step 840 may include as part of a fourth stage of the pipeline: (1) using the first computing resource, initiating processing of a first forward pass associated with a fourth layer of the L layers, (2) using the second computing resource, initiating processing of a second forward pass associated with the second layer of the L layers, and (3) using the third computing resource, initiating a backward pass associated with the first layer of the L layers. In this example, this step may correspond to pipeline stage 608 of FIG. 6. Thus, as part of this step, processor P1 may initiate the processing of the first forward pass (M4) for a fourth layer of the neural network model; processor P2 may initiate the processing of the second forward pass (M3) for the third layer of the neural network model; and processor P3 may initiate the processing of the first backward pass (B1) for the first layer of the neural network model.

Step 850 may include as part of a fifth stage of the pipeline: (1) using the first computing resource, initiating processing of a first forward pass associated with a fifth layer of the L layers, (2) using the second computing resource, initiating processing of a second backward pass associated with the first layer of the L layers, and (3) using the third computing resource, updating weights associated with the first layer of the L layers when gradients associated with the weights are accumulated. In this example, this step may correspond to pipeline stage 608 of FIG. 6. Thus, as part of this step, processor P1 may initiate the processing of the first forward pass (M5) for a fifth layer of the neural network model; processor P2 may initiate the processing of the second backward pass (B1) for the first layer of the neural network model; and processor P3 may initiate the updates of the weights (W1) for the first layer of the neural network model. Although FIGS. 8A and 8B describe a certain number of steps performed in a certain order, additional or fewer steps in a different order may be performed.

In conclusion, the present disclosure relates to a method for processing a neural network comprising L layers, where L is an integer greater than two. The method may include partitioning the L layers among a set of computing resources configured to process forward passes and backward passes associated with each of the L layers. The method may further include initiating processing of the forward passes and the backward passes using the set of computing resources. The method may further include upon completion of a first set of forward passes and a first set of backward passes associated with a first layer of the L layers, initiating update of parameters associated with the first layer when gradients are available for updating the parameters associated with the first layer without waiting to calculate gradients associated with any of remaining L layers.

The partitioning the L layers among the set of computing resources may comprise splitting parameters associated with the neural network substantially equally among the set of computing resources. The neural network may be configured to perform natural language processing. The neural network may further comprise an input stage coupled to provide input to the L layers and where the neural network further comprises an output stage coupled to receive output from the L layers.

The parameters may comprise weights, and the method may further comprise initiating update of weights associated with a second layer of the L layers when gradients are available for updating the weights associated with the second layer, and where the initiating the update of the weights associated with the second layer of the L layers is asynchronous to the initiating the update of the weights associated with the first layer of the L layers. The set of computing resources may comprise a first computing resource, a second computing resource, and a third computing resource arranged sequentially such that the forward passes and the backward passes are processed in a pipelined fashion. The method may further include accumulating gradients over a specified number of backward passes.

In another example, the present disclosure relates to a system for processing a neural network comprising L layers, where L is an integer greater than two. The system may include a set of computing resources configured to process forward passes and backward passes associated with each of the L layers, where the L layers are partitioned among the set of computing resources, where each of the set of computing resources is configured to asynchronously initiate an update of weights associated with a layer of the L layers when gradients are available for updating the weights associated with the layer without having to receive gradients associated with any of remaining L layers.

The weights associated with the neural network may be substantially equally split among the set of computing resources. The neural network may further be configured to perform natural language processing. The neural network may further comprise an input stage coupled to provide input to the L layers and the neural network may further comprise an output stage coupled to receive output from the L layers.

The set of computing resources may comprise a first computing resource, a second computing resource, and a third computing resource arranged sequentially such that the forward passes and the backward passes are processed in pipelined fashion. A subset of the set of computing resources may further comprise an accumulator configured to accumulate gradients over a specified number of backward passes.

In a yet another example, the present disclosure relates to a method for processing a neural network comprising L layers, where L is an integer greater than two. The method may include as part of a first stage of a pipeline, using a first computing resource initiating processing of a first forward pass associated with a first layer of the L layers. The method may further include as part of a second stage of the pipeline: (1) using the first computing resource, initiating processing of a first forward pass associated with a second layer of the L layers and (2) using a second computing resource, initiating processing of a second forward pass associated with the first layer of the L layers. The method may further include as part of a third stage of the pipeline: (1) using the first computing resource, initiating processing of a first forward pass associated with a third layer of the L layers, (2) using the second computing resource, initiating processing of a second forward pass associated with the second layer of the L layers, and (3) using a third computing resource, initiating processing of a third forward pass associated with the first layer of the L layers. The method may further include as part of a fourth stage of the pipeline: (1) using the first computing resource, initiating processing of a first forward pass associated with a fourth layer of the L layers, (2) using the second computing resource, initiating processing of a second forward pass associated with the second layer of the L layers, and (3) using the third computing resource, initiating a backward pass associated with the first layer of the L layers. The method may further include as part of a fifth stage of the pipeline: (1) using the first computing resource, initiating processing of a first forward pass associated with a fifth layer of the L layers, (2) using the second computing resource, initiating processing of a second backward pass associated with the first layer of the L layers, and (3) using the third computing resource, updating weights associated with the first layer of the L layers when gradients associated with the weights are accumulated.

Each of the first layer, the second layer, the third layer, the fourth layer, and the fifth layer may correspond to a transformer. The method may further include partitioning the L layers substantially equally among at least the first computing resource, the second computing resource, and the third computing resource. The neural network may further be configured to perform natural language processing. The neural network may further comprise an input stage coupled to provide input to the L layers and the neural network may further comprise an output stage coupled to receive output from the L layers.

The method may further include accumulating gradients over a specified number of backward passes. The method may further include accumulating gradients over a specified number of cycles associated with the pipeline.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with, transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for processing a neural network comprising L layers, wherein L is an integer greater than two, the method comprising:
   partitioning the L layers among a set of computing resources configured to process forward passes and backward passes associated with each of the L layers, wherein the partitioning the L layers among the set of computing resources comprises splitting parameters associated with the neural network substantially equally among the set of computing resources;
   initiating processing of the forward passes and the backward passes for each given layer among the L layers using the set of computing resources;
   upon completion of a first set of forward passes and a first set of backward passes associated with a first layer of the L layers, initiating update of a first set of parameters associated with the first layer assigned to a first computing resource from among the set of computing resources when a first set of accumulated gradients are available for updating the first set of parameters associated with the first layer, without waiting to calculate gradients associated with any of remaining L−1 layers, and after a completion of the update of the first set of parameters associated with the first layer, flushing the first set of accumulated gradients; and
   upon completion of a second set of forward passes and a second set of backward passes associated with a second layer of the L layers, initiating update of the second set of parameters associated with the second layer assigned to a second computing resource from among the set of computing resources when a second set of accumulated gradients are available for updating the second set of parameters associated with the second layer without waiting to calculate gradients associated with any of remaining L−2 layers, and after a completion of the update of the second set of parameters associated with the second layer, flushing the second set of accumulated gradients, and wherein the initiating the update of the second set of parameters associated with the second layer is asynchronous to the initiating the update of the first set of parameters associated with the first layer.

2. The method of claim 1, wherein the neural network is configured to perform natural language processing.

3. The method of claim 1, wherein the neural network further comprises an input stage coupled to provide input to the L layers and wherein the neural network further comprises an output stage coupled to receive output from the L layers.

4. The method of claim 1, wherein each of the first set of parameters and the second set of parameters comprises weights.

5. The method of claim 1, wherein the set of computing resources is arranged sequentially such that the forward passes and the backward passes are processed in a pipelined fashion.

6. The method of claim 1 further comprising determining a first block average of the first set of accumulated gradients after a first specified number of backward passes and determining a second block average of the second set of accumulated gradients after the specified number of backward passes.

7. A system for processing a neural network comprising L layers, wherein L is an integer greater than two, the system comprising:
   a set of computing resources configured to process forward passes and backward passes associated with each of the L layers, wherein the L layers are partitioned among the set of computing resources splitting weights associated with the neural network substantially equally among the set of computing resources; and
   wherein each of the set of computing resources is configured to asynchronously initiate an update of weights associated with a layer of the L layers when gradients are available for updating the weights associated with the layer without having to receive gradients associated with any of remaining L layers, wherein the set of computing resources comprises a first computing resource and a second computing resource arranged in a manner such that the forward passes and the backward passes are processed in pipelined fashion, wherein the system is configured to:
   (1) upon completion of a first set of forward passes and a first set of backward passes associated with a first layer of the L layers, initiate update of a first set of parameters associated with the first layer assigned to a first computing resource from among the set of computing resources when a first set of accumulated gradients are available for updating the first set of parameters associated with the first layer, without waiting to calculate gradients associated with any of remaining L−1 layers, and after a completion of the update of the first set of parameters associated with the first layer, flush the first set of accumulated gradients, and
   (2) upon completion of a second set of forward passes and a second set of backward passes associated with a second layer of the L layers, initiate update of the second set of parameters associated with the second layer assigned to a second computing resource from among the set of computing resources when a second set of accumulated gradients are available for updating the second set of parameters associated with the second layer, without waiting to calculate gradients associated with any of remaining L−2 layers, and after a completion of the update of the second set of parameters associated with the second layer, flush the second set of accumulated gradients.

8. The system of claim 7, wherein the neural network is configured to perform natural language processing.

9. The system of claim 7, wherein the neural network further comprises an input stage coupled to provide input to the L layers and wherein the neural network further comprises an output stage coupled to receive output from the L layers.

10. The system of claim 7, wherein a subset of the set of computing resources further comprises an accumulator configured to accumulate gradients over a specified number of backward passes.

11. A method for processing a neural network comprising L layers, wherein L is an integer greater than two, the method comprising:
  as part of a first stage of a pipeline: using a first computing resource, initiating processing of a first forward pass associated with a first layer of the L layers;
  as part of a second stage of the pipeline: (1) using the first computing resource, initiating processing of a first forward pass associated with a second layer of the L layers and (2) using a second computing resource, initiating processing of a second forward pass associated with the first layer of the L layers;
  as part of a third stage of the pipeline: (1) using the first computing resource, initiating processing of a first forward pass associated with a third layer of the L layers, (2) using the second computing resource, initiating processing of a second forward pass associated with the second layer of the L layers, and (3) using a third computing resource, initiating processing of a third forward pass associated with the first layer of the L layers;
  as part of a fourth stage of the pipeline: (1) using the first computing resource, initiating processing of a first forward pass associated with a fourth layer of the L layers, (2) using the second computing resource, initiating processing of a second forward pass associated with the second layer of the L layers, and (3) using the third computing resource, initiating a backward pass associated with the first layer of the L layers; and
  as part of a fifth stage of the pipeline: (1) using the first computing resource, initiating processing of a first forward pass associated with a fifth layer of the L layers, (2) using the second computing resource, initiating processing of a second backward pass associated with the first layer of the L layers, and (3) using the third computing resource, without waiting to calculate gradients associated with any of remaining L−1 layers updating weights associated with the first layer of the L layers when gradients associated with the weights are accumulated and after a completion of the updating of weights associated with the first layer of the L layers, flushing the accumulated gradients, and wherein updating of weights associated with the L layers is performed asynchronously.

12. The method of claim 11, wherein each of the first layer, the second layer, the third layer, the fourth layer, and the fifth layer corresponds to a transformer.

13. The method of claim 11 further comprising partitioning the L layers substantially equally among at least the first computing resource, the second computing resource, and the third computing resource.

14. The method of claim 11, wherein the neural network is configured to perform natural language processing.

15. The method of claim 11, wherein the neural network further comprises an input stage coupled to provide input to the L layers and wherein the neural network further comprises an output stage coupled to receive output from the L layers.

16. The method of claim 11 further comprising accumulating gradients over a specified number of backward passes.

17. The method of claim 11 further comprising accumulating gradients over a specified number of cycles associated with the pipeline.

18. The method of claim 1, wherein at least a subset of the L layers corresponds to a transformer.

19. The system of claim 7, wherein at least a subset of the L layers corresponds to a transformer.

20. The system of claim 7, wherein the system is further configured to determine a first block average of the first set of accumulated gradients after a first specified number of backward passes and determine a second block average of the second set of accumulated gradients after the specified number of backward passes.

* * * * *